June 15, 1937.  A. MOORE  2,084,258
METHOD OF CONTROLLING THE IGNITION FOR INTERNAL COMBUSTION ENGINES
Original Filed Oct. 23, 1930
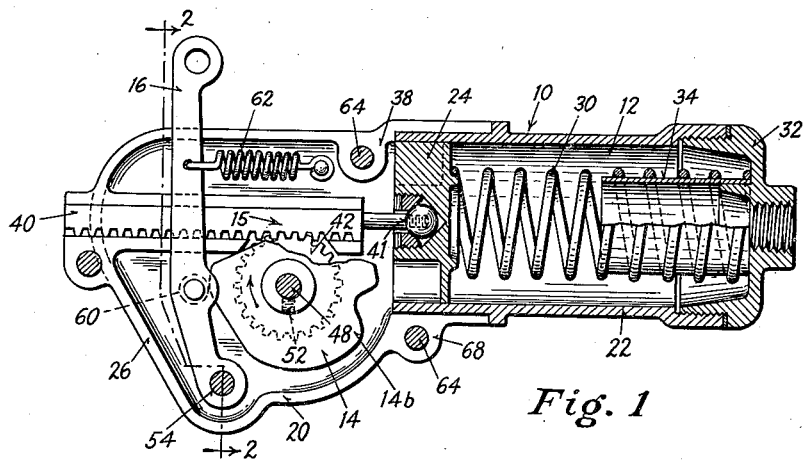
Fig. 1
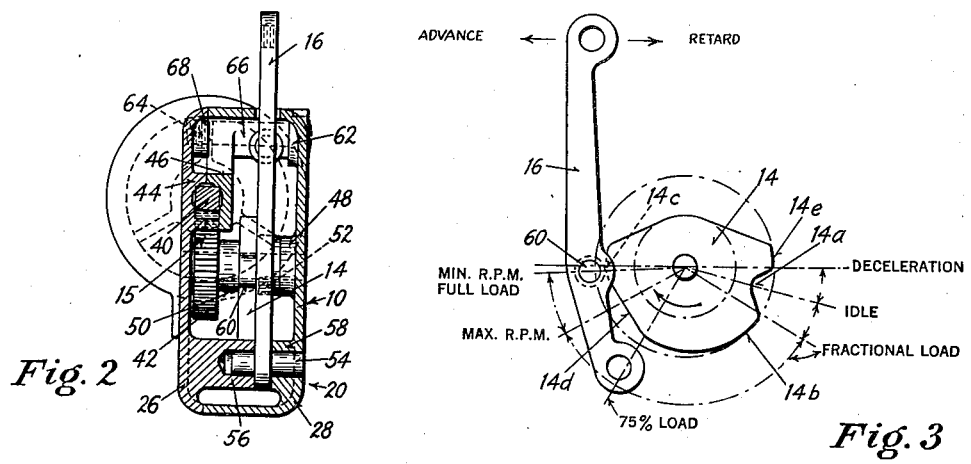
Fig. 2
Fig. 3
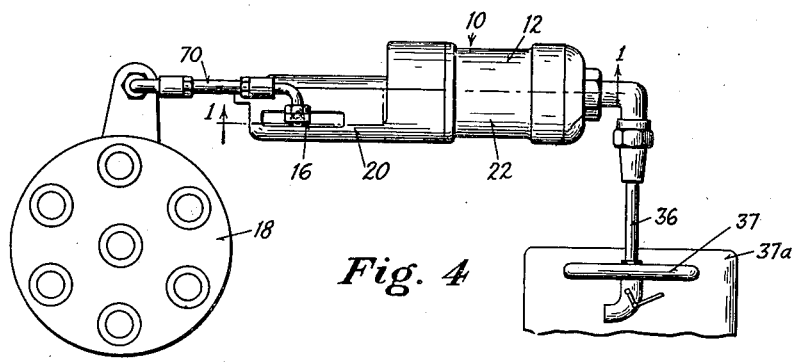
Fig. 4
INVENTOR.
Arlington Moore
BY  J. Bascom Smith
ATTORNEY.

Patented June 15, 1937

2,084,258

UNITED STATES PATENT OFFICE 2,084,258

METHOD OF CONTROLLING THE IGNITION FOR INTERNAL COMBUSTION ENGINES

Arlington Moore, Louisville, Ky., assignor, by mesne assignments, to Maxmoor Corporation, New York, N. Y., a corporation of Delaware Original application October 23, 1930, Serial No. 490,632. Divided and this application November 29, 1935, Serial No. 52,022

8 Claims. (Cl. 123—117)

This invention relates to internal combustion engines and more particularly to a method for timing the ignition of the explosive mixture in said engines such, for example, as automotive engines which require flexibility of control over a wide range of speeds and loads.

This application is a division of my copending application Serial No. 490,632, filed October 23, 1930.

One of the objects of the present invention is to provide a simple, efficient and reliable device and a novel method for varying or controlling the ignition timing or sparking of an internal combustion engine in accordance with the requirements for efficient engine operation.

Another object of the invention is to provide a novel method for controlling the timing or sparking in engines of various makes, types, characters, etc., and to provide a device which may be readily adjusted or modified to control the timing in accordance with said method.

Another object is to provide a novel method for controlling the ignition in internal combustion engines whereby the ignition timing or sparking is caused to substantially follow a predetermined ignition curve in response to pressure variations brought about by changes of the speed and load.

The above and further objects and novel features of the invention will more fully appear from the following detail description when taken in connection with the accompanying drawing. It is to be expressly understood, however, that the drawing is for the purpose of illustration only and is not to be taken as a definition of the limits of the invention, reference being had for this purpose to the appended claims.

In the drawing, wherein like reference characters refer to like parts throughout the several views, Fig. 1 is a longitudinal section, with parts broken away, the section being taken substantially on line 1—1 of Fig. 4, showing one form of device which may be employed in carrying out the method of the present invention;

Fig. 2 is an end view of the device taken on line 2—2 of Fig 1;

Fig. 3 is a diagram illustrating the operation of one form of cam for controlling the ignition timing; and, Fig. 4 is an elevation of the device, the same being shown connected to a distributor and to the intake manifold of an internal combustion engine.

Referring to the drawing, one form of mechanism which may be employed in carrying out the novel method of the present invention is illustrated, by way of example, as comprising a device 10 adapted to automatically control the ignition timing at all loads and speeds in accordance with pressure developed as a result of engine operation and varying with such loads and speeds.

The device 10 is preferably operated pneumatically in response to fluid pressure variations developed during engine operation, the pressure varying with the speed and/or load and includes pressure responsive means 12, a cam 14 having a configuration or contour predetermined to approximate the desired ignition curve and means 15 for actuating the cam from the pressure responsive means, the cam 14 coacting with a lever or follower 16 connected to the timing device of distributor 18. The parts are enclosed within a casing 20 including a cylindrical portion 22 in which the piston 24 moves and a wall portion 26 forming a closure at one side of the movable parts actuated from the piston 24, the opposite side being closed by cover plate 28.

The pressure responsive means 12 in the device illustrated is adapted for operation in response to variations in intake depression in the intake at the posterior side of the throttle, the intake depression decreasing as the throttle opens, assuming that the speed remains constant, and increasing with the engine speed and hence varying as a function of both load and speed. The pressure responsive device 12 may be readily modified to be responsive to other pressure variations, such as gauge pressure variations indicative of the charge weight. For example, the exhaust gas pressure which varies directly as a function of load and speed throughout the range of engine operation may be utilized for controlling the ignition.

In the embodiment illustrated, the movement of piston 24 is opposed by a spring 30 disposed in cylinder 22 between said piston and a cap 32, the spring being centered by a sleeve 34. The interior of the cylinder communicates through a conduit 36 threaded to cap 32 with the region of intake depression or reduced pressure such, for example, as the intake manifold 37 of the internal combustion engine 37a, the opposite side 38 of the piston being exposed to atmospheric pressure. When it is desired to employ the exhaust gases of engine 37a to operate device 10, spring 30 may be positioned to operatively engage face 38 of piston 24 and normally hold the latter toward the right-hand end of cylinder 22, as seen in Fig. 1, and conduit 36 may be connected to the exhaust manifold (not shown) of said engine in lieu of intake manifold 37.

As the pressure differential on piston 24 varies, a straight line movement is imparted to rack 40 which is flexibly connected to said piston by any suitable means, such as universal joint 41. The straight line or longitudinal movement of rack 40 is effective to rotate a pinion 42, with which it is in constant mesh, and cam 14 connected to said pinion, the cam controlling the movement of lever 16.

The casing parts 26 and 28 are constructed to allow the movable parts to be readily assembled, interchanged or replaced, as desired. For this purpose, the parts 26 and 28 substantially at the plane of junction thereof are provided with cooperating portions 44 and 46 forming therebetween a guideway for the rack 40. A transverse shaft 48 is journalled on the parts 26 and 28, the pinion 42 and cam 14 being secured thereto by set screws 50 and 52. The lever 16 at one end is provided with pivot pins 54 journalled in aligned bosses 56 and 58 projecting towards each other from the parts 26 and 28. The lever 16 is normally held with the roller 60 thereof in engagement with the cam by the spring 62 connected at one end to the lever and at its opposite end to part 28. The parts 26 and 28 are secured together, with the parts 14, 16, 40 and 42 therebetween, by screws 64, each extending transversely through a boss 66 on the part 28 and threaded into a boss 68 on the other part 26. The opposite end of the lever 16 is connected to the distributor 18 by an adjustable link 70.

The contour of the cam 14 is determined by calibration so that, as intake depression varies, the roller 60 engages the cam at points so positioned to cause the lever 16 to assume for each value of intake depression the proper position for giving the desired spark or ignition angle.

The spark position is at times advanced and at times retarded as the intake depression varies in one direction, and further, the variations in spark advance or retardation are not proportionate to the variations in intake depression, because the rate of change of one differs from the rate of change of the other. It may be desirable for certain engines to prevent change in ignition angle over a portion of the range of variation of the pressure, as by providing a dwell upon the cam 14. During the idling of the engine, smooth operation can be obtained with a spark ignition angle that is retarded from ignition angle of fractional loads. Such retarding is obtained by providing a recess or reduction 14a on the cam at the point thereof corresponding to idling. As soon as the engine begins operation at light fractional loads, the ignition angle is advanced by engagement of the roller 60 with the elevated part 14b of the cam which moves the lever 16 into position for maximum spark advance. Substantial spark advances are provided by the portion 14b when the initial cylinder pressure and final compression pressures are low, and the flame wave temperatures low, which enables complete combustion by igniting the material earlier, and as the load increases the ignition angle is gradually retarded as the lever 16 engages points on the portion 14b of greater reduction.

In order to adequately control the ignition angle over the speed range at wide open throttle, when fuels of low volatility are utilized, and especially when the top speed of the engine is relatively low, the ignition angle should be slightly retarded as the speed increases. For high speed engines, however, having considerable valve overlap, and using fuels of high volatility the ignition angle should be increased with the speed. In both cases, the higher the compression ratio the less the advance in ignition angle. By provision of a suitably contoured cam, the ignition angle can be advanced or retarded at full load operation, as desired. The cam 14, illustrated as one example, is provided with an angle advancing elevated portion 14c, which predetermines the ignition angle for full load minimum speed, and a reduced portion 14d which retards the spark as the speed increases, the movement of the cam then being in the reverse direction to the arrow because the depression increases with the speed. It may be desirable to have the cam formed to advance the ignition angle during deceleration, when the intake depression exceeds that of normal idling. I, therefore, provide on the cam an elevated portion 14e beyond the idling portion 14a to insure early burning of the charge material entering the cylinders during such period.

The contour of the cam 14 is varied to correspond with the required ignition angle cycle for various engines and conditions. Different types of engines, such as valve-in-head, L-head, and T-head engines call for characteristic ignition timing. Automatic control of the ignition angle is also particularly advantageous when fuel oils, fuels heavier than gasoline, are employed which are more liable to detonate, accurate ignition timing reducing this tendency to detonate. The cam 14, illustrated as one example, is particularly adapted for controlling ignition where such heavy fuels are employed, since the portion 14d retards the ignition timing as the speed increases at full loads. This is the reverse of the action of the usual speed operated governor for controlling the spark.

My device is substantially universal in its adaptability for controlling the ignition angle in accordance with various ignition curves. The cams are interchangeable and readily synchronized, as by proper selection of gear ratio, with the pressure variations. The mechanical structure of the device is such that by merely releasing the screws 64, and removing the cover 28, a cam of the desired predetermined configuration or contour may be placed in position and adjusted so that the various points thereof engage the lever 16 in synchronism with the pressure variations indicative of the charge weights. The device is thus readily adapted for various types of engines, various fuels, various compression ratios, etc., to control or vary the ignition to obtain, as the conditions of operation vary, efficiency in such operation.

In my device, the variations in ignition timing follow a predetermined ignition curve by means of a cam constructed or contoured to cause variation in accordance with the desired curve to obtain a predetermined ignition angle for each value of intake depression. The variation in timing therefore is strictly a function of the cam contour, the intake depression, or other pressure variation, being utilized merely to bring each point on the cam into operative relation with the roller 60 to obtain the desired ignition angle at the value of intake depression corresponding to the engine load or speed for which the ignition angle is suited. The spring 30 is adjusted to return the piston 24 to the position shown when the pressures at opposite sides thereof are equal and to oppose the pressure differential substantially throughout the range thereof. As the pressure differential varies the rack 40 is moved in a straight line and rotates the cam 14 through pinion 42. The cam causes movement of the lever 16 to control the distributor 18 of the engine.

My device is entirely automatic in its operation, and dispenses with manual control of the ignition angle and control by speed responsive devices. The efficiency, however, in any engine operating with this method of ignition control is a substantial advance over that obtained with conventional or usual methods.

Having thus described my invention, what I claim and desire to secure by Letters Patent is:

1. The hereindescribed method of controlling the ignition for internal combustion engines which consists in advancing the spark at certain stages of engine operation and retarding the spark at other stages by a fluid pressure developed during engine operation and varying with the load and speed, said fluid pressure being made effective to vary the spark in opposite directions as the pressure varies in either direction.

2. The hereindescribed method of controlling the ignition for internal combustion engines, which consists in translating the variations in a fluid pressure developed during engine operation and varying with the load and speed into a movement controlling the ignition in accordance with a predetermined ignition curve such that the spark is both advanced and retarded as the pressure varies in each direction.

3. The hereindescribed method of controlling the ignition for internal combustion engines, which consists in translating the variations in intake depression into a movement controlling the ignition in accordance with a predetermined ignition curve such that the ignition is both advanced and retarded as the intake depression varies in either direction over the range thereof.

4. The hereindescribed method of controlling the ignition for internal combustion engines which consists in causing the variations in a pressure difference resulting from engine operation at various loads and speeds to vary the spark advance in accordance with a predetermined ignition curve such that the spark is at times advanced and at other times retarded as the pressure difference varies in each direction.

5. The hereindescribed method of controlling the ignition for internal combustion engines which consists in translating the variations in a pressure difference resulting from engine operation at various loads and speeds into motion effective in causing variation of the spark advance in accordance with a predetermined ignition curve such that, as the pressure difference causes said motion, the spark advance is made to vary at times as a direct function of the variations in pressure difference and at other times as an inverse function thereof.

6. The hereindescribed method of controlling the ignition for internal combustion engines which consists in translating the variations in intake depression substantially over the range thereof into a motion effective in causing variation of the spark advance in accordance with a predetermined ignition curve such that, although the variation in intake depression causes said motion, the spark advance is made to vary at times as a direct function of the variations in intake depression and at other times as an inverse function thereof.

7. The hereindescribed method of controlling ignition for internal combustion engines which consists in causing the variations in a pressure difference resulting from engine operation at various loads and speeds to vary the spark advance in accordance with a predetermined ignition curve such that the spark is retarded at engine idling, advanced at fractional load operation, and retarded as full load conditions are approached, the variations in spark advance being effected by translating motion in either direction produced by the pressure difference variations into a spark controlling motion in opposite directions.

8. The hereindescribed method of controlling ignition for internal combustion engines which consists in causing the variations in intake depression substantially throughout the range thereof to vary the spark advance in accordance with a predetermined ignition curve such that the spark is retarded at engine idling, advanced at fractional load operation, and relatively retarded at full load operation, the variations in spark advance under the various conditions of engine operation being effected by translating motion in either direction produced by the variations in intake depression into a spark controlling motion in opposite directions.

ARLINGTON MOORE.